United States Patent
DaCosta

(10) Patent No.: US 7,873,974 B2
(45) Date of Patent: *Jan. 18, 2011

(54) IDENTIFICATION OF TELEVISION PROGRAMMING USING A PORTABLE WIRELESS DEVICE

(75) Inventor: Behram DaCosta, San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 1029 days.

This patent is subject to a terminal disclaimer.

(21) Appl. No.: 11/657,761

(22) Filed: Jan. 25, 2007

(65) Prior Publication Data

US 2007/0124775 A1     May 31, 2007

Related U.S. Application Data

(63) Continuation-in-part of application No. 11/229,862, filed on Sep. 19, 2005, now Pat. No. 7,344,084.

(51) Int. Cl.
| | |
|---|---|
| H04N 7/16 | (2006.01) |
| H04N 7/173 | (2006.01) |
| G06K 7/10 | (2006.01) |
| G06K 9/54 | (2006.01) |
| H04M 1/00 | (2006.01) |

(52) U.S. Cl. .............. 725/62; 725/86; 725/87; 725/104; 235/472.01; 235/472.02; 455/556.2; 382/305; 382/307

(58) Field of Classification Search .......... 725/62, 725/86, 87, 104; 235/472.01, 472.02; 455/556.2; 382/305, 307

See application file for complete search history.

(56) References Cited

U.S. PATENT DOCUMENTS

| | | | |
|---|---|---|---|
| 5,537,107 | A | 7/1996 | Funado |
| 5,710,605 | A | 1/1998 | Nelson |
| 6,002,450 | A | 12/1999 | Darbee et al. |
| 6,278,499 | B1 | 8/2001 | Darbee et al. |
| 6,396,523 | B1 | 5/2002 | Segal et al. |

(Continued)

FOREIGN PATENT DOCUMENTS

JP     2003-339041     * 11/2003

(Continued)

OTHER PUBLICATIONS

Web page for 411-Song (www.411song.com), Date unknown.

(Continued)

*Primary Examiner*—Hoang-Vu A Nguyen-Ba
(74) *Attorney, Agent, or Firm*—Miller Patent Services; Jerry A. Miller

(57) ABSTRACT

A method consistent with certain embodiments provides portable delivery of television programs to a portable wireless device (PWD) involves using the PWD to capture a sample of a program being played by a television; transmitting attributes of the captured sample to a service provider so that the service provider can identify the program being played by the television; and receiving the television program at the PWD from the service provider via a wireless transmission. This abstract is not to be considered limiting, since other embodiments deviate from the features described in this abstract.

26 Claims, 7 Drawing Sheets

U.S. PATENT DOCUMENTS

| | | |
|---|---|---|
| 6,484,011 B1 | 11/2002 | Thompson et al. |
| 6,532,592 B1 | 3/2003 | Shintani et al. |
| 7,111,788 B2 | 9/2006 | Reponen |
| 7,616,840 B2 * | 11/2009 | Erol et al. .................... 382/305 |
| 2002/0003547 A1 | 1/2002 | Wang et al. |
| 2002/0026462 A1 | 2/2002 | Shotton, Jr. et al. |
| 2002/0044225 A1 | 4/2002 | Rakib |
| 2002/0154888 A1 | 10/2002 | Allen et al. |
| 2002/0180894 A1 | 12/2002 | Okajima et al. |
| 2002/0184625 A1 | 12/2002 | Allport |
| 2003/0035074 A1 | 2/2003 | Dubil et al. |
| 2003/0070177 A1 * | 4/2003 | Kondo et al. ................ 725/106 |
| 2003/0093813 A1 | 5/2003 | Shintani et al. |
| 2004/0054689 A1 | 3/2004 | Salmonsen et al. |
| 2004/0259537 A1 | 12/2004 | Ackley |
| 2005/0010963 A1 | 1/2005 | Zeng et al. |
| 2005/0054337 A1 | 3/2005 | Nobusawa et al. |
| 2005/0108751 A1 | 5/2005 | DaCosta |
| 2005/0113113 A1 | 5/2005 | Reed |
| 2006/0014535 A1 * | 1/2006 | Walker et al. ................ 455/433 |
| 2006/0206582 A1 * | 9/2006 | Finn .......................... 709/217 |

FOREIGN PATENT DOCUMENTS

| | | |
|---|---|---|
| JP | 2004-343175 | * 12/2004 |
| WO | WO 99/60782 | 11/1999 |

OTHER PUBLICATIONS

First Office Action, Chinese Patent Application No. 200680034515.7 (corresponding to US 7,344,084); Mailed Nov. 6, 2009, Received Jan. 15, 2010.

International Search Report and Written Opinion of the International Searching Authority, PCT/US06/29647, Feb. 27, 2007 (Received Mar. 9, 2007).

* cited by examiner

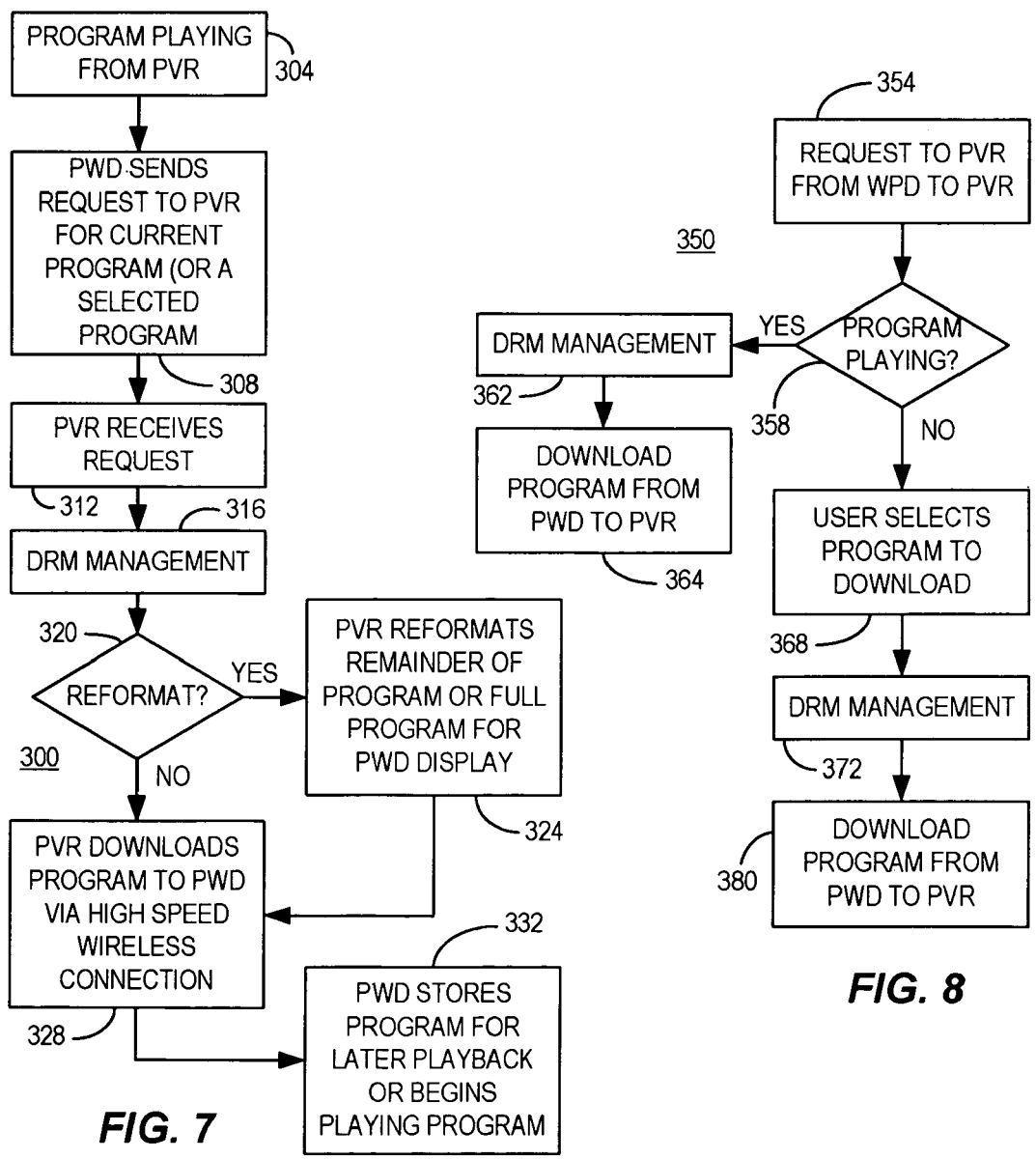

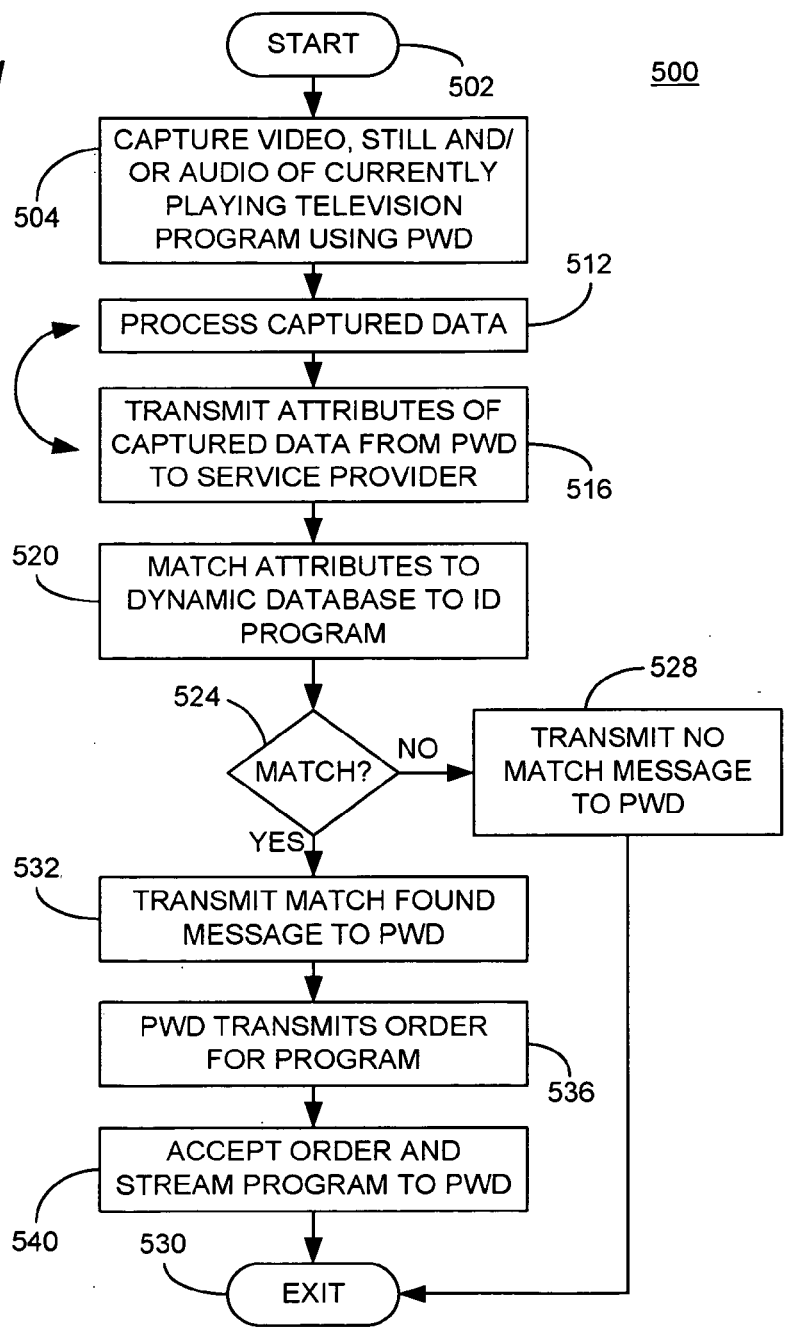

IDENTIFICATION OF TELEVISION PROGRAMMING USING A PORTABLE WIRELESS DEVICE

CROSS REFERENCE TO RELATED DOCUMENTS

This application is a continuation-in-part of U.S. patent application Ser. No. 11/229,862 filed Sep. 19, 2005 now U.S. Pat. No. 7,344,084 which is hereby incorporated by reference.

BACKGROUND

Portable electronic devices have grown in capability over the last several years. Along with this growth in capability, has come an emergence in various forms of wireless communication technology. As a result, the lines of distinction between palmtop computers, personal organizers, cellular wireless telephones, entertainment devices, personal game console, pagers and the like have blurred and overlapped. Collectively and individually, these devices are referred to herein as Portable Wireless Devices (PWD). As the capability of such devices has increased, PWDs have proliferated and people have become accustomed to using such devices and always having them on hand. People have also demanded greater functionality from such devices.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 6 is a block diagram illustrating a Personal Video Recorder (PVR) in communication with a PWD in a manner consistent with certain embodiments of the present invention.

FIG. 7 is a flow chart depicting operation of one process of the system of FIG. 6 in a manner consistent with certain embodiments of the present invention.

FIG. 8 is another flow chart depicting operation of one process of the system of FIG. 6 in a manner consistent with certain embodiments of the present invention.

FIG. 11 is a flow chart of an alternative embodiment in which the television is not enabled to transmit to the PWD in a manner consistent with certain embodiments of the invention.

DETAILED DESCRIPTION

Figure 1:
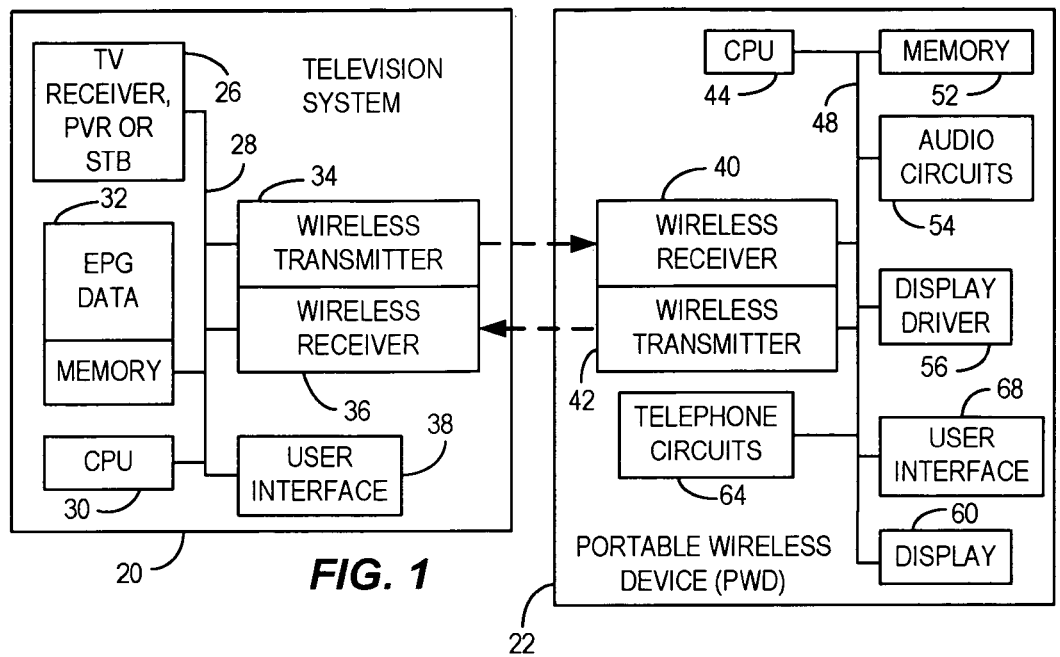
FIG. 1 is a block diagram illustrating a television system in wireless communication with a portable wireless device (PWD) in a manner consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is used in two separate contexts. In the first context, the term is used in the sense of a "television program". In this context, the term is used to mean any coherent sequence of audio video content which would be interpreted and reported in an electronic program guide as a single television program, without regard for whether the content is a movie, sporting event, segment of a multi-part series, news broadcast, etc.

In the second context, the term "program" is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The meaning of the terms will be apparent from the context of use in the present document.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

One problem addressed using embodiments consistent with the present invention is the lack of content synchronization between one mobile device and other fixed/mobile devices. In particular what is needed is improved and more intuitive place-shifting of content using PWDs. (Note that this problem is not the exclusive problem addressed by embodiments consistent with the present invention, and addressing this problem is not a requirement for all embodiments consistent with the present invention.) Consider the following scenarios, and the solution provided by certain embodiments consistent with the present invention:

Scenario #1:

Joe is at the gym working out and watching a movie on the gym's big-screen TV. The movie is "Tomb Raiders of Timbuk 2". He completes his workout at the gym, and is ready to leave, but does not want to miss the suspenseful ending to the movie. Joe's options? (a) Stay around longer at the gym simply to watch the rest of the movie, (b) leave the gym and miss the rest of the movie, (c) leave the gym and try to watch the movie on his cell-phone (which received DVB-H terrestrial broadcasts for example), if he can only figure out if and where the movie "Tomb Raiders of Timbuk 2" (and not "Tomb Raiders of Timbuk 3" for example) is on the airwaves that his cell phone receives.

With certain embodiments consistent with the present invention, Joe points his cell-phone (or other PWD) at the TV and pushes a key on the cell phone, after which the cell phone also begins to display "Tomb Raiders of Timbuk 2" on a display thereof. In this embodiment, the cell phone receives the movie from a compatible terrestrial broadcast of the movie, not from the TV. Note that if the TV is displaying pre-recorded content, according to another embodiment, the actual content can be downloaded rapidly from the TV to Joe's cell phone or other portable device in faster than real time assuming Digital Rights Management (DRM) requirements (if any) are met for the content and Joe's cell-phone. (A similar case of pre-recorded content is outlined in scenerio #3.) If "Tomb Raiders of Timbuk 2" is not receivable on the cell phone (either via terrestrial broadcast or 3G transmission, etc), then Joe is notified that the content is not accessible on the cell phone, or Joe is asked if he would like to pay to receive this content as premium 3G or broadcast content from the cell phone (or other) content provider.

Scenario #2:

Mary has been watching a live news broadcast on her cell phone (via DVB-H, or 3G, or DMB (digital multimedia satellite broadcasting for mobile devices), or regular terrestrial TV broadcasts, etc) on the bus on her way home from work. Now that she enters her house she would like to continue watching the news on her living room TV in order to take advantage of a larger display and enhanced audio capabilities. In this embodiment, Mary simply points her cell phone at her TV. In response, the TV turns on and starts displaying the live news program Mary was watching on her cell-phone.

Scenario #3:

The kids are watching cartoons on the living room TV. These cartoons were pre-recorded via the PVR (personal video recorder—also known as a digital video recorder) from an earlier broadcast. However, mom needs to do errands, and she must take the kids with her. But the kids insist on watching Cartoons.

In this situation, according to one embodiment consistent with the present invention, Mom points her cell phone to the TV (or PVR) and pushes a key. This causes the cartoon content on the PVR to be synchronized (in this case quickly downloaded) onto her cell phone. She puts the kids into the van's rear seat, points the cell-phone at the van's video entertainment display and pushes another key on the cell phone which causes the cell-phone's contents to be synched (in this case downloaded, but possibly also streamed from the phone in real time) to the car's video system which continues playing the cartoons for the children.

It should be noted that a similar scenario is also possible for music without accompanying video, or video without accompanying audio. Also note that Mom could have also allowed the children to view the content on the cell phone during the walk from the living room to the van if the kids could not be deprived of cartoons for more than a few seconds.

In the above scenarios any mobile device (i.e., PWD) may be used instead of a cell phone (e.g. personal video game console or palmtop computer may be used) for the primary and the secondary devices. Hence "synching" between mobile devices themselves may also occur. Note that several supporting DRM (digital rights management) solutions are possible, but are not described here since DRM is out of scope of this document. Many other scenarios are possible, sharing home videos on a friend's TV, synchronizing contents from camcorder onto home TV/PVR, etc. without departing from embodiments consistent with the present invention. In certain preferred embodiments, the transfer is effected by merely "pointing to the target device" for synchronization and actuating an appropriate switch in any suitable user interface. Hence, as outlined in the above scenarios it is desirable to be able to provide the user with seamlessly place-shifted content. Thus, in addressing the various exemplary embodiments disclosed herein, the term "television system" is used to broadly encompass devices such as PVRs, video cassette recorders, Digital Versatile Disc (DVD) players, camcorders, television sets and television set-top boxes to name a few examples of devices that are capable of receiving television broadcasts or playing television content or television-like content or other audio-visual, audio or video content without limitation.

For purposes of this document, any suitable portable wireless device (PWD) can be utilized as the mobile device described in the scenarios above. Examples of such devices are cellular telephones, wireless telephones, personal digital assistants (PDA), palm-top computers, and personal information managers, game consoles, etc. to name a few.

Turning now to FIG. 1, one embodiment of a system operating generally as described above is depicted in block diagram form. In this system, a television system 20 communicates with a portable wireless device 22 in a manner similar to that described above, for example in scenario number one. In this embodiment, the television system 20 may incorporate a television receiver either in the form of a television set, personal video recorder (PVR) or a television set top box (STB) such as those used for reception of cable or satellite transmissions. Such television receiver is depicted as block 26 above in television system 20 Television system 20 may similarly be a system of multiple interconnected independent components or may be housed in any combination of one or more housings without departing from embodiments consistent with the present invention. Television receiver 26 is connected, for example via a bus 28, with a central processing unit (CPU) 30 which oversees operation of television system 20. While a single bus is depicted in the present illustration, one of ordinary skill in the art will appreciate, upon consideration of the present teachings, that multiple buses and multiple processors may be utilized to affect the operation of the television system 20 as described herein.

CPU 30 communicates with memory 32 via bus 28. In addition, CPU 30 controls the operation of, and regulates data to and from, a wireless transmitter 34 and a wireless receiver 36. Television system 20 incorporates one or more user interfaces 38 which permit the user to interact with the television system. As will become clear later, memory 32 may include electronic programming guide (EPG) data, as well as an operating system and other operational instructions utilized by the central processing unit 30. Television system 34's wireless transmitter 34 is in communication with portable wireless device 22 via device 22's wireless receiver 40. Similarly, television system 20 is in communication with portable wireless device 22's wireless transmitter 42 via wireless receiver 36. PWD 22 similarly contains a central processing unit 44 which is coupled via one or more buses 48 to operational memory 52, as well as audio circuits 54, a display driver 56, and a display 60.

In accordance with certain embodiments consistent with the present invention, memory 52 may include a combination of storage technologies including, but not limited to, Random Access Memory (RAM) as well as flash memory or disc storage as well as other forms of storage such as for example Read Only Memory (ROM) devices. In certain embodiments, memory 52 may be utilized for storage of content that is downloaded from a content supplier, as will be described later.

In the example shown, the portable wireless device 22 may be a cellular or other wireless telephone device, in which case telephone circuits 64 are also present within PWD 20 and operate under control of the central processing unit. Also present in the portable wireless device 22 is a user interface which may be any suitable user interface 68 for interaction with the user of the portable wireless device 22.

Thus, a Portable Wireless Device (PWD) consistent with certain embodiments has a transmitter that transmits a wireless request from the PWD, the request comprising a request for a program identifying information relating to a television program currently being received by a recipient device. A receiver receives a response from the recipient device, wherein the response delivers program identifying information to the PWD. A wireless source compatible with the PWD for receipt of the television program is identified using the identifying information. The transmitter transmits an order for the television program from the PWD to the identified wireless source. The PWD receives a wireless transmission of the television program from the identified source.

A a portable wireless device (PWD) consistent with certain embodiments has a receiver that receives a wireless transmission of a television program on the PWD and a wireless receiver that receives a request for identifying information relating to a television program currently being received by the PWD. A wireless transmitter transmits a response comprising identifying information identifying the program currently being received by the PWD.

A television device consistent with certain embodiments has a wireless receiver that receives a request from a wireless device, the request comprising a request for a television program currently being played by the television receiver system. A processor retrieves the television program currently being played by the television receiver system. A wireless transmitter transmits the television program currently being received to the wireless device.

A television receiver device consistent with certain embodiments has a wireless receiver that receives an instruction from a wireless device, the instruction comprising a request for tuning to a specified television program identified by transmitted program identifying information. An electronic program guide (EPG) is retrieved having information for available television programming available to the television receiver device. A processor correlates the specified program identifying information with the EPG information to identify a channel carrying the specified program. A television tuner tunes to the identified channel. For tunerless implementations of televisions such as with IPTV (Internet Protocol Television), the television selects the multicast/broadcast IP stream corresponding to the identified channel, or requests transmission of the corresponding IP stream from the Service Provider if the stream is not already being multicast/broadcast.

Another television device consistent with certain embodiments has a wireless receiver that receives a request from a wireless device, the request comprising a request for electronic program guide (EPG) information relating to a television program currently being received by the television receiver system. A processor retrieves EPG information identifying the television program currently being received by the television receiver system. A wireless transmitter transmits the EPG information identifying the television program currently being received to the wireless device.

Figure 2:
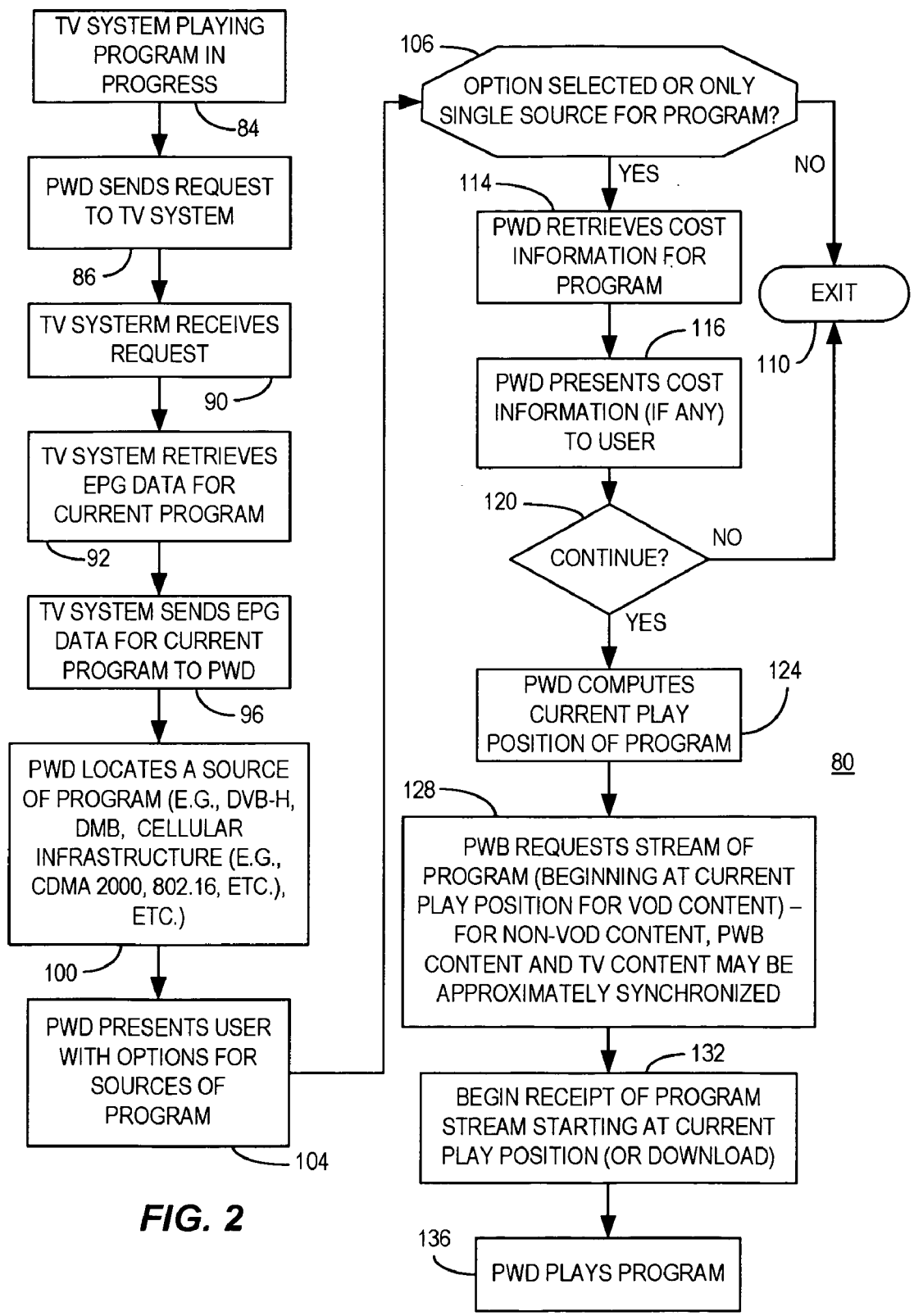
FIG. 2 is a flow chart depicting operation of one process of the system of FIG. 1 in a manner consistent with certain embodiments of the present invention.

One mode of operation of this pair of devices 20 and 22 is depicted in FIG. 2 as process 80 starting at 84. At 84, the television system is presumed to be playing a television program already in progress. If the user of the portable wireless device 22 desires to begin reception of the program in progress on portable wireless device 22, the user activates an appropriate command from the user interface 68 and PWD 22 sends a request to the television system at 86. The television system receives the request at 90, and at 92 the television system retrieves electronic programming guide (EPG) data for the currently playing program. The television system then sends the electronic program guide data, which is stored in memory 32, via wireless transmitter 34 to wireless receiver 40 of PWD 22 at 96.

At this point, the portable wireless device 22 utilizes its wireless communications capability via either telephone circuitry or wireless transmitter 42 to locate a source of the program identified by the EPG data received from television system 20. The PWD 22 may locate this source of the program at 100, with the source being any of a number of potential sources for the television program. The identification can take place by virtue of identifying an identical television program name, or other identifier (e.g., VCR+ code, etc.) By way of example, and not limitation, DVB-H, DMB, or the cellular infrastructure such as CDMA 2000 or 802.16, etc. may be utilized as a source for the desired programming at 100. Once the source of the program is located at 100, PWD 22 presents the user with options for sources of the program (assuming more than one source has been identified). Once the options are presented to the user at 104, an option is selected at 106 by the user via the user interface (or if only a single option is available, that option is presented to the user at 106). If no option is identified at 106, the process exits at 110 with the user being informed via a suitable error message that no content is available for the portable wireless device.

After selection of an option at 106, the PWD 22 retrieves cost information for the television program at 114 (if any). At 116, the PWD presents the cost information, if any, to the user for approval. If the user elects not to continue at 120, the process exits at 110. However, if the user chooses to proceed at 120, the PWD 20 computes a current play position of the program (if relevant, i.e. in the event the program is a pay-per-view program or a video-on-demand program) at 124. The PWD 22 then requests a stream of program content beginning at the current play position for VOD at 128. For non-VOD content, the PWD 22 and the television content may be approximately synchronized by virtue of being generated by the same source (for example a real time news broadcast or network provided programming). At 132, the PWD begins receipt of the television program stream starting at the current play position in one embodiment or receives a download of the television program in another embodiment. At 136, the PWD begins playing back the program (or in another embodiment stores the program for later retrieval).

In accordance with the above process 80, a user, via the user interface of PWD 22 can obtain transfer or simultaneous playback of a program that is playing on a television system by simply pointing the PWD 22 at the television system 20 and operating a specified control of the user interface. Thus the PWD 22 utilizes its wireless transmitter 42 to initiate a transfer of electronic program guide information from television system 20. Television system 20 receives the request for such information via wireless receiver 36 and then utilizes wireless transmitter 34 to transmit the EPG information to wireless receiver 40. At this point, as previously explained, PWD 22 can identify alternate sources of the television program which are compatible with PWD 22. Then, under user control, the portable wireless device 22 can begin reception of either a streaming transmission of the selected television program or a download of certain programs to the PWD's memory 52 for later playback.

In process 80, the user is able to essentially effect a transfer of the playback from a television system 20 to a portable wireless device such as a telephone or palm-top computer. This can be handy to the user who is leaving a location of the television system 20, for example to go to a friend's house. However, it is also desirable that once the user reaches his destination he is able to proceed with enjoying the remainder of the television program utilizing a larger format video display. Thus, the user may wish to utilize a similar process to transfer the television program identification from the portable wireless device to a larger format television system. One example process for carrying out such a transfer is shown as process 150 of FIG. 3 starting at 152.

At 152, the PWD 22 is playing a program already in progress, but desires to begin enjoying that television program on a television system. In order to accomplish this, the user aims the PWD toward the target television system (such as 20) and sends an instruction via wireless transmitter 42 to the wireless receiver 36 of the television system 20 at 154. This instruction transmitted at 154 instructs the television system to begin playback of the program. The television system acknowledges the command at 158 or else an error message is generated at 162 to inform the user that the television system 20 has not yet acknowledged the instruction. Once the instruction is acknowledged, the subsequent action depends upon whether the television system 20 is in a standby mode at 164. If so, the television system is powered up at 168. However, if the television system is already on at 164, the powering up at 168 is unnecessary and is bypassed.

The PWD 20 then sends via wireless transmitter 42 the program guide data associated with the currently playing program at 172. This information is received at wireless receiver 36. Under control of CPU 30, the television system 20 retrieves electronic program guide data to determine what programming is currently available to the television system. The television system then at 180 searches the EPG data for a matching program. If no matching program is found at 184, an error message is displayed at 162, either at the television system or at the portable wireless device or both.

If a corresponding television program is found at 184, a determination is made by the television system 20 as to whether or not charges will apply for viewing the program at 186. If no charge is applied, the television system tunes to the program and begins play at the current program location if possible at 188. In one embodiment, the PWD also ceases playback of the program at 190, or the user may manually terminate the playback of the program.

If the service provider permits a program to be viewed for no additional charge only one device at any time (e.g. on only the television or only on the PWD at any given time and not on both simultaneously), then the television system 20 may in fact take over playback from the PWD 22 if the user wishes to not pay additional charges for viewing on both devices simultaneously.

If charges apply at 186, the television system 20 presents the user with cost information and asks if charges are accepted at 192. If the user does not accept the charges, control returns to 152 at 196. However, if the user accepts the charges, then control passes to 188 as previously described.

Figure 4:
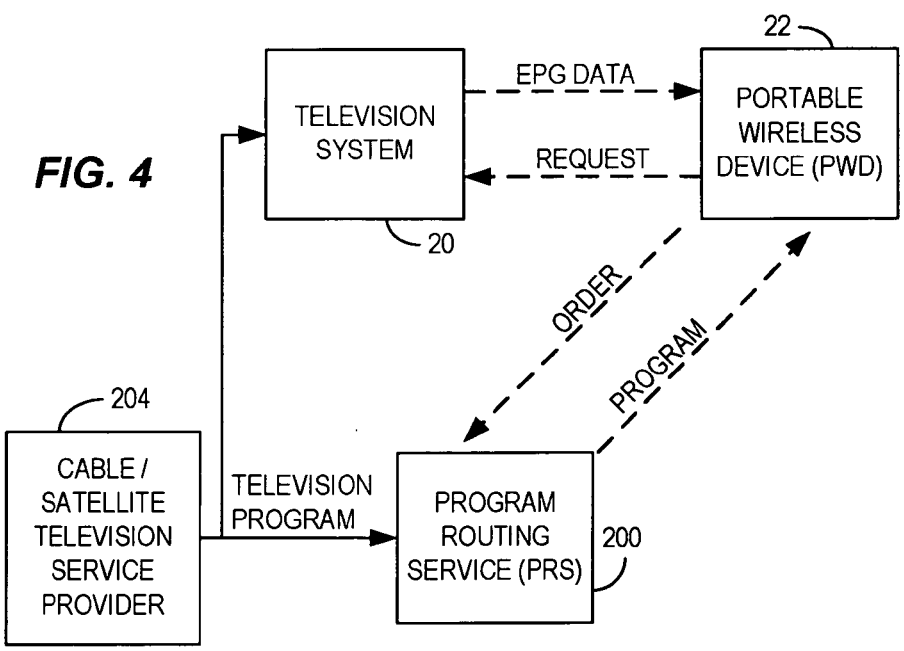
FIG. 4 depicts a PWD obtaining a television program from a program routing service (PRS) in a manner consistent with certain embodiments of the present invention.
Figure 3:
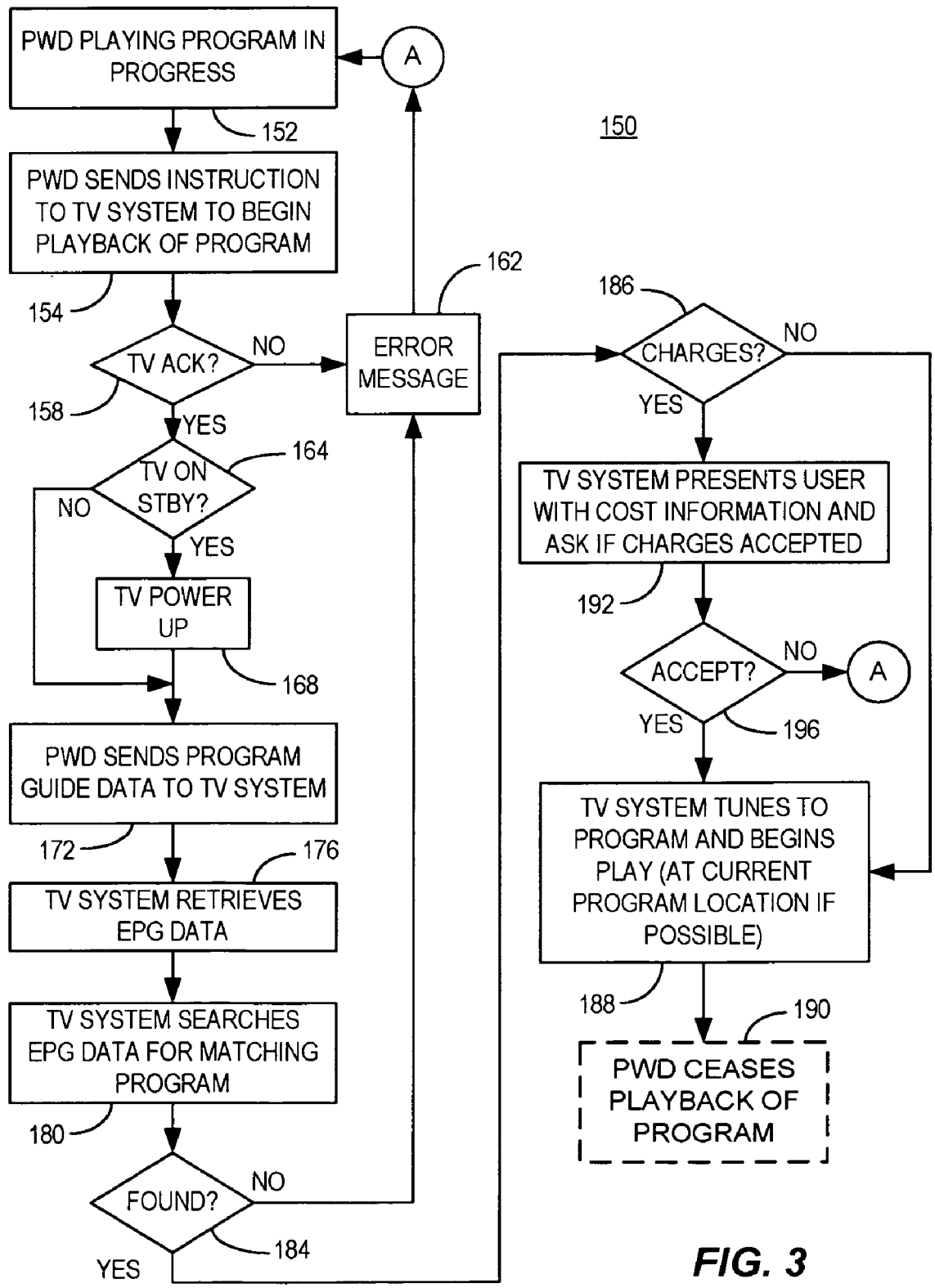
FIG. 3 is another flow chart depicting operation of one process of the system of FIG. 1 in a manner consistent with certain embodiments of the present invention.

Thus, in accord with the methods of FIGS. 3-4, for providing portable delivery of television programs to a portable wireless device (PWD) involves transmitting a request from the PWD to a television receiver system, the request comprising a request for electronic program guide (EPG) information relating to a television program currently being received by the television receiver system; receiving a response from the television receiver system, wherein the response delivers EPG information to the PWD; identifying a source compatible with the PWD for receipt of the television program using identifying information from the EPG; transmitting an order for the television program from the PWD to the identified source; and receiving a wireless transmission of the television program from the source to the PWD.

In certain embodiments, variations can be realized wherein receiving the wireless transmission involves receiving one of a download and a streaming transmission of the television program. In other embodiments, the TV receiver can be one of a television set, a personal video recorder (PVR) and a television set top box. The source compatible with the PWD can be, for example, one of DVBH, DMB, and cellular infrastructure. The source compatible with the PWD comprises a cellular infrastructure can be, for example, CDMA 2000 or IEEE 802.16. The identifying can involve identifying a source of a television program having an identical program identifier. The transmitting the request can involve transmitting a wireless signal from the PWD to the television system. Transmitting the order can involve placing an order via a cellular telephone infrastructure. Receiving the wireless transmission of the television program can involve receiving a high speed data transmission via a cellular telephone infrastructure.

Another method for providing portable delivery of television programs using a portable wireless device (PWD) involves receiving an instruction transmitted from the PWD at a television receiver system, the instruction comprising television program information relating to a television program currently being received by the PWD; retrieving electronic program guide (EPG) data for channels available to the television receiver; identifying a channel available to the television receiver that provides the television program by using the television program information to identify a television program entry in the EPG; the television receiver tuning to the identified television program; and the television receiver receiving the identified television program.

In certain embodiments, The TV receiver is one of a television set, a personal video recorder (PVR) and a television set top box. Identifying the channel can involve comparing the EPG data with data transmitted from the PWD to identify a channel of a television program having an identical program identifier. Receiving the instruction involves receiving a wireless signal from the PWD to the television system using a mm Wave, infrared, or Radio Frequency (RF) communication.

Turning now to FIG. 4, a variation of certain embodiments consistent with the present invention is depicted. In this embodiment, a portable wireless device 22 (similar in nature to the prior portable wireless device 22) also communicates with television system 20 (which is similar in nature to the television system 20 of FIG. 1). However, in this embodiment, PWD 22 requests EPG data from television system 20 and EPG data is supplied from television system 20 to portable wireless device 22 in a manner similar to that previously described. Once the PWD 22 is in possession of the EPG data for the currently playing television program, the PWD places an order for the program from a program routing service 200. The program routing service 200 receives the order and obtains the television program from a cable or satellite television service provider (or alternatively from a terrestrial broadcast of the television program or other source) and then provides the program directly to the portable wireless device 22. The program routing service may, in fact, be affiliated with the service provider 204 or may be affiliated with a wireless telephone service provider in order to supply the service to PWD 22.

Although not explicitly shown in FIG. 4, a reverse process is also possible where the portable wireless device sends EPG data to the television system 20 in order for the television system 20 to secure a corresponding television program from cable or satellite (or other) television service provider 204.

Thus, in accordance with one embodiment consistent with the present invention, a method for providing portable delivery of television programs to a portable wireless device (PWD) involves transmitting a request from the PWD to a television receiver system, the request comprising a request for electronic program guide (EPG) information relating to a television program currently being received by the television receiver system; receiving a response from the television receiver system, wherein the response delivers EPG information to the PWD; transmitting the EPG information to a routing service provider (RSP); transmitting an order for the television program from the PWD to the RSP; and receiving a wireless transmission of the television program from the RSP, wherein the RSP obtains the television program from a program provider.

Figure 5:
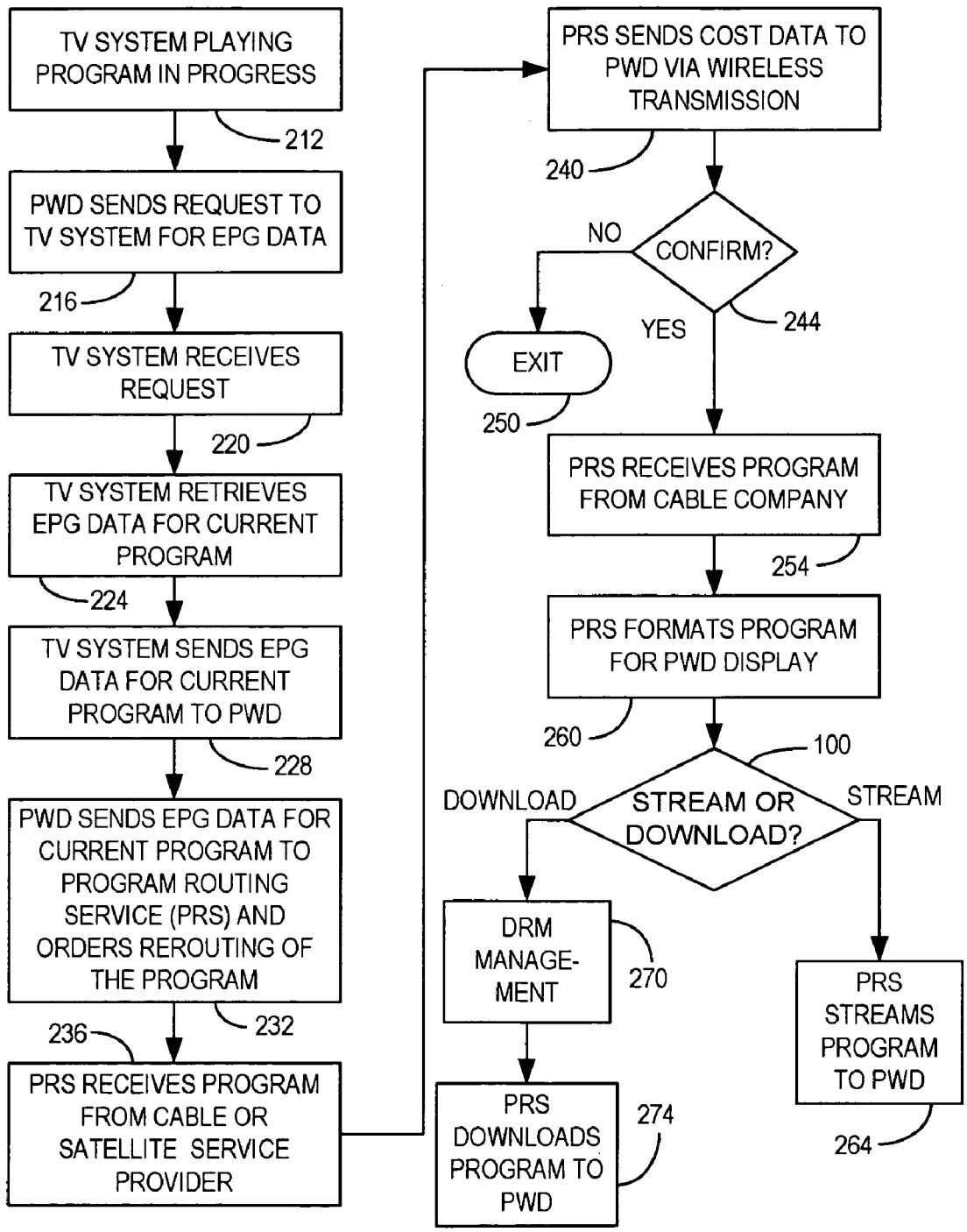
FIG. 5 is a flow chart depicting operation of one process of the system of FIG. 4 in a manner consistent with certain embodiments of the present invention.

Turning now to FIG. 5, a more detailed process 210 is described for the operations of the system shown in FIG. 4 starting at 212 where the television system is playing a program already in progress. At 216, the user points the PWD 22 at the television system 20 and requests via the user interface on the PWD 22 for the television system to transmit EPG data back to the PWD. The television system 20 then receives the request at 220 and retrieves EPG data for the current program at 224. The television system then sends the electronic programming guide data for the current program to the PWD 22 at 228.

Once the PWD 22 is in possession of the EPG data for the current program, it can send this EPG data to the program routing service 200 at 232 and order a routing of the program to the portable wireless device 22. The television program routing service receives the program from the cable or satellite or IPTV (Internet Protocol Television) service 204 or otherwise at 236. In the event there is cost associated with routing the television program to the PWD 22, the PRS 200 may send cost data to the PWD via a wireless transmission at 240. (In other embodiments, the program routing may be provided by subscription or by other means.) If the portable wireless device fails to confirm the desire to receive the programming at the specified charge, the process exits at 250. Otherwise, if the user confirms the desire to receive the television program at 244, control passes to 254 where the PRS receives the program from the cable company and reformats the program at 260 for display on the portable wireless device.

In accordance with certain embodiments, the PRS 200 may either stream or download the content to the portable wireless device 22. If streaming is used, control passes to 264 where the portable wireless device receives the stream of information containing the television program from the PRS. If the content is to be downloaded, some form of DRM (digital rights management) may need to be effected at 270, after which the PRS downloads the program to the PWD at 274. Various forms of DRM/Copy Protection may also be used for streamed content, depending on content and implementation details.

In yet another embodiment consistent with the present invention, a portable wireless device such as 22 can obtain downloads of the programming content that has been previously recorded on a personal video recorder 20 as shown in FIG. 6. Additionally, the PWD can transfer programming to a personal video recorder. A personal video recorder is often referred to as a digital video recorder since the recording medium is commonly a hard disc drive or other digital medium. A process 300 for obtaining a download from the personal video recorder 20 to portable wireless device 22 is depicted as processes 300 of FIG. 7 starting at 304 where a program is playing from the PVR. The wireless portable device 22 sends a request to the PVR for the current program (or in another embodiment the portable wireless device sends a request to the PVR for a selected program which may be identified via a suitable user interface at 308). The PVR receives the request at 312 and carries out a DRM management function at 316 if necessary. The user can determine in certain embodiments whether or not the television program is to be reformatted at 320 before downloading to the portable wireless device 22. In certain embodiments, it is advantageous to reformat (i.e. transrate and transcode) the program in order to conserve storage space on the portable wireless device. Since the portable wireless device will likely have a smaller screen than that used to display information from the PVR directly, substantial memory savings can be achieved by reformatting. However, it may be desirable to obtain a non-reformatted copy of the content so that it can be restored to another personal video recorder. Note that it is also possible for the TV to act as a proxy for the PVR. In this case the PWD interacts with the TV, and the TV presents information to the PWD on behalf of the PVR.

If the user elects to reformat the content, control passes to 324 where the PVR reformats the remainder of the program (or the full program) for display by the portable wireless device. Control then passes to 328. If no reformatting is selected at 320, control also passes to 328 where the PVR downloads the program to the portable wireless device via a high-speed wireless connection. The portable wireless device then stores the program for later playback or immediately begins playing the program at 334.

FIG. 8 depicts the reverse operation in which a request is sent from the portable wireless device to the PVR to download a program from the portable wireless device. If the program is currently playing at 358, control passes to 362 where a DRM management process may be invoked. The program can then be downloaded at 364 from the portable wireless device to the PVR. If the program is not currently playing at 358, the user may be presented a menu or other user interface that permits the user to select a program for download at 368. A DRM management function can then be carried out at 372, and the program is downloaded from the portable wireless device to the PVR at 380. While not explicitly shown in the process 350 of FIG. 8, a reformatting operation can also be provided as an option in much the same manner as it was provided in process 300.

Figure 9:
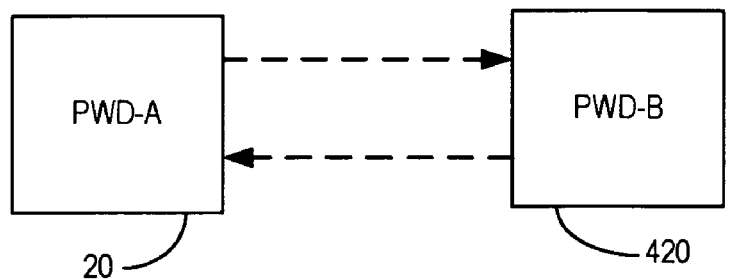
FIG. 9 is a block diagram illustrating a PWD in communication with another PWD in a manner consistent with certain embodiments of the present invention.
Figure 10:
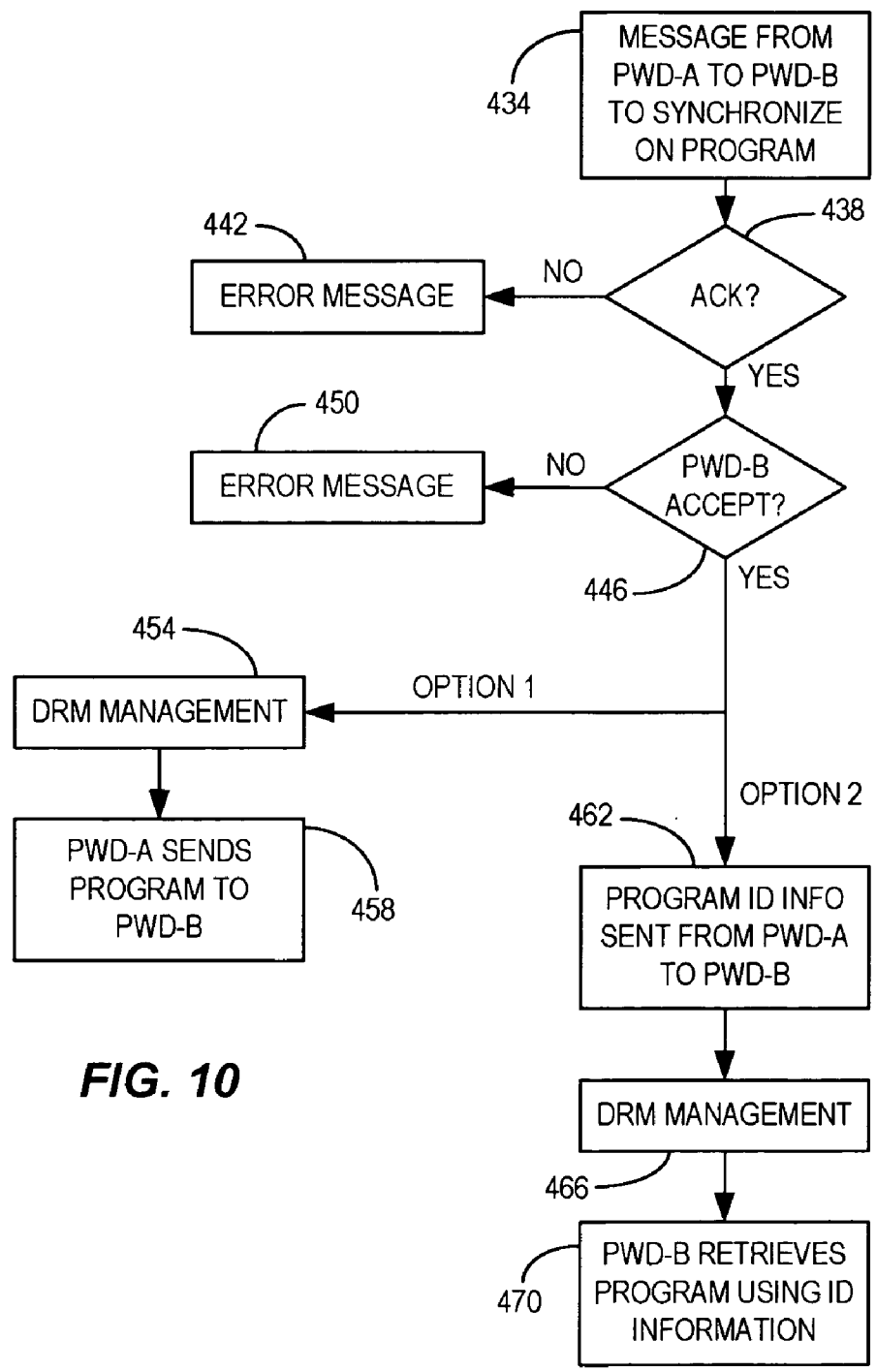
FIG. 10 is a flow chart depicting operation of one process of the system of FIG. 9 in a manner consistent with certain embodiments of the present invention.

Referring now to FIG. 9, it is also possible within certain embodiments consistent with the present invention to transfer program identifying information or the program itself from one portable wireless device to another. FIG. 9 depicts a portable wireless device A as PWD 20 and a portable wireless device B as PWD 420. In this embodiment, both devices are similar in nature in that they are at. least able to carry out the functionality described and communicate using a compatible protocol. A process used to carry out this function is depicted as process 430 of FIG. 10. This process starts at 434 where a message is transmitted from portable wireless device A to portable wireless device B to request synchronization on a common television program. At 438, the portable wireless device B acknowledges the message or an error message is generated at 442. Once successful acknowledgment and and an initial handshaking operation for communication is achieved between the two portable wireless devices, portable wireless device B acknowledges the desire to synchronize with portable wireless device A or else generates an error message at 450, and the synchronization process is terminated. If portable wireless device B accepts the synchronization request at 446, one of two options can occur. In option one, a DRM management function is carried out at 454 and the portable wireless device A sends the television program directly to portable wireless device B via a high-speed wireless interface. If option two is utilized, program identification information is sent from the portable wireless device A to portable wireless device B at 462. If necessary, a DRM function can be carried out at 466 after which the portable wireless device B retrieves the program from the same source used by portable wireless device A by use of the program identification information received at 462 at 470. In this manner, a pair of portable wireless devices can be synchronized to receive the same television program (or other content). Thus, if two people wish to watch the same program, they do not have to share the same screen on the portable wireless device (which may be uncomfortably small for multiple viewers and/or may present difficulties in providing the audio program to both users).

Thus, according to certain embodiments, a method for providing synchronized delivery of content to multiple portable wireless devices (PWD), involves transmitting a synchronization message from a first PWD to a second PWD, requesting synchronization of receipt of content being played by the first PWD; transmitting program identification information from the first PWD to the second PWD, the program identification information including implicit or explicit source identifying information; transmitting an order for the content from the second PWD to the source identified by the source identifying information; and receiving a wireless transmission of the content from the identified source to the second PWD. The content may be sent by download or stream, and the content can be a television program, audio or video or other audio-visual content.

In another embodiment, a method for synchronizing content to multiple portable wireless devices (PWD) involves transmitting a wireless synchronization message from a first PWD to a second PWD, requesting synchronization of content being played by the first PWD; and synchronizing the content by transmission of the content from the one of the first PWD and second PWD to the other of the first PWD and second PWD.

Thus, as described above, television programming or other content, be it audio or visual or both, can be made portable so that a user can carry a program from place to place without interrupting viewing if desired.

One exemplary proposed embodiment of a system consistent with the present invention has four main components/functions:

(a) a directional and (ideally) line-of-sight wireless transmitter/receiver on the mobile device;
(b) a directional or semi-omni-directional and (ideally, but not necessarily) line-of-sight wireless transmitter/receiver on the fixed device (e.g. big screen TV) (or a second instance of element ((a));
(c) the above wireless transmitters/receivers (Tx/Rx) may be low speed or high speed. If they are low speed, then in addition a separate high-speed wireless Tx/Rx can be used on the mobile and fixed devices. These high speed devices may be directional or omni-directional;
(d) Communication protocol between all devices. A common, and preferably standardized protocol is established to confirm a wireless link between devices, to exchange information on program being watched (e.g. name, channel, etc) during synchronization, and to exchange actual AV (audio-visual) content if needed. In addition, the communication protocol may also optionally implement authentication/encryption for privacy/confidentiality if enabled by the owner of the devices, and/or DRM using encryption.

The following describes one embodiment consistent with the present invention. The fixed device (e.g. TV) has a semi-omni-directional wireless transmitter/receiver implemented using mmWave (e.g. 60-80 GHz) wireless RF technology. The semi-omni-directionality is provided using a suitable horn antenna to provide a beam width of 45 deg for example. Semi-omni-directionality is ideal on the TV (or other base unit such as PVR) for the user's convenience during synchronization (so it is not too difficult to "align" the mobile device with the TV's wireless beam, and at the same time not to be too wide so the TVs receives signals coming from incorrect directions such as behind the TV).

Millimeter Wave (mmWave) technology provides high speed (~Gbps) throughputs at relatively low power consumption per bit, and somewhat higher attenuation than 802.11x technologies which hence for mmWave limits interference and inadvertent "privacy invasion" from other devices, the latter of which can be important in some scenarios if encryption has not been enabled. Interference is also limited by directionality of the antennas that limits the range of directions of launched and received RF energy which limits propagation in spite of the higher reflectivities of materials at these wavelengths. In addition, reducing transmit powers reduces distance of RF propagation for this application.

mmWave technology is also implemented on the mobile devices, but is usually made more directional (narrower beam width of antenna). This allows the user to accurately select amongst one or more target devices for synchronization, which is possible for the user to do since the mobile device is movable.

When mmWave technology is used, ideally the Tx and Rx are used for both the initial communication/handshaking between the two devices being synchronized as well as for the actual high speed data (content) transfer between the devices, in cases where the latter is needed as described in the scenarios (i.e. when pre-recorded content is being synchronized).

If the content being synchronized is live content, then only content descriptors (program name, channel) may be transmitted according to this embodiment, and the receiving device attempts to locate and receive from the channel, or another channel with the same content. Hence EPG information suitable for relevant reception methods may be used by one or both devices.

Note that different devices may locate different sources for the content. For example, a large screen TV may receive the content via cable HDTV or satellite broadcast. Another device may find the same content on a terrestrial SDTV broadcast, whereas a cell phone or other PWD may find the same content on a DVB-H or SDTV-terrestrial broadcast or SDTV satellite or 3G transmission.

Note also that during synchronization of pre-recorded content, the content may be transcoded and/or transrated depending on capabilities of the two devices which may also be overridden by user preferences.

It may be necessary or desirable in certain scenarios to be able to tell the mobile device whether to synchronize the currently viewed content from the target device to the mobile device on which the "synch" button is pressed, or whether to synch the currently viewed content on the mobile device to the target device, since both devices may be currently displaying content. This can be accomplished, for example, using the arrow keys on the mobile device (up arrow indicating "away from user" and hence transfer content from mobile to target device, and down arrow indicating "towards user" and hence transfer content from target device to mobile device).

In the above example, the wireless technology used was based on mmWaves. However that is not the only option, and the present invention should not be considered limited to that embodiment. Suitably directional UWB (Ultra Wide Band) or free-space optical transmission technologies may be used instead, as both these are high-bandwidth and low-interference implementations. Free space optics may be slightly less preferable due to its more severe directionality (which is makes it more demanding for users), however this potentially also makes it more secure for high-security applications. An Omni-directional implementation is used (omni-directional antennas for UWB or other 802.11x for example), for implementations that allow the user to place the cell phone/mobile device (PWD) in any orientation (for example on the couch) for downloading/uploading of content longer than 4-5 seconds, as it may get tiresome for some users to hold the mobile device pointed at the target device for the entire duration for large content. At data rates of 1 Gbps for mmWave (e.g. 60 GHz) implementations, a 2.5 hour SD MPEG-2 movie would take 30 seconds to download; H264 compression can decrease this to 10 seconds. Other wireless technologies such as 802.11x may also be used, however these are generally less preferable for this application due to potentially greater problems with regards to interference from other RF devices (including other 802.11x devices), though the lack of directionality may be compensated for as follows: an optical mechanism or selective directional RF beam determines spatial alignment and line-of-sight conditions (for target device selection), and then 802.11x or omni-directional UWB or another omni-directional wireless method for transmission of actual contents.

An omni-directional implementation of UWB may also be used as the sole wireless technology, and in this case synchronization occurs between devices sufficiently near to one another as opposed to being pointed at each other. While this is one acceptable implementation, it may not always be the ideal implementation proposed here since it is not possible always to be near the target device.

There is a simplified implementation consistent with certain embodiments of this invention that allows mobile devices to synchronize their content from that of a TV system, but not necessarily the reverse. It works as follows. The TV system continuously transmits (using one or more of the wireless technologies mentioned earlier) the EPG information for the program currently displayed on the TV. This EPG transmission from the TV occurs regardless of whether there are any "listening" mobile devices. If and when a user with a mobile device is in the vicinity of the TV, the user can make his/her mobile device receive (or "sniff") the broadcast EPG information and synchronize with it, without handshaking or any transmission from the mobile device to the TV. Such an implementation can be particularly useful for publicly viewed television systems e.g. in bars, on streets, etc.

Note that at this writing several mobile devices including cell phones already have 4+ Gbyte storage space using Flash memory or HDD, so storage on such mobile devices is adequate to implement all described embodiments of such an invention, and such storage is constantly increasing with greater economy.

Note that in accord with certain embodiments, owners who place their TV's or other devices in public locations can limit whether any synchronization is to occur with the device and if so in what (or both) directions the synchronization is allowed to occur, using menu-type "enable/disable" options, or conditional options e.g. "allow synchronization only for mobile devices with correct authenticity key"

In Scenario #3 as described above, a mode was briefly mentioned where the mobile device (e.g.) cell phone could optionally stream in real time to a separate display, without the display having to store the content. This mode places a greater demand on the cell phone's or other PWD's battery and may not be ideal if the cell phone battery is near depletion. However if cell phone battery capacity is adequate (or if mains power is used to power the cell phone) the portable device may stream in real time directly to a display (e.g. automobile display, large screen TVs, etc), at SD or HD resolutions. Such a mode can simplify DRM issues for content transfer, as the content may be considered to always reside on the cell phone. Note that as in all other examples, the content may be either audio video content or may be only audio or only video. In this case the mobile device becomes a mobile content storage and player, but can also be used for wireless streaming to separate displays (and/or separate audio players). Such a mobile "personal store" for large amounts of content (i.e. potentially large libraries of AV content) become increasingly more viable as costs for content storage plummet and storage capacities increase rapidly. In such implementations, and where DRM is an issue, it can be beneficial to transmit the content from portable device to the external display using "baseband" (uncompressed) content which is encoded (e.g. HDCP), since uncompressed but encrypted content is considered more secure than compressed encrypted content, from the perspective of copy protection and DRM. Note that the suggested wireless transmission techniques (mmWave, free space optics, and UWB) all can support, under certain conditions, the 1+ Gbps data rates desired to transmit even HD uncompressed content.

Note that it is not necessary to "turn on" the TV prior to synching content to it and displaying this content via a mobile device. Just as a TV in "standby" state can be activated using a conventional remote control, in the same way the TV may be turned on by initiating a synchronization to the TV. The TV's wireless modules may be maintained in a low power state in which they monitor for initial received signals from a mobile device upon which the wireless modules enter a higher power state for further interrogation of the mobile device and potential power of the entire TV.

While embodiments disclosed herein were disclosed in terms of a television program as the content of interest, other embodiments are also possible. For example, consider a pair of portable music players. A user of the first music player (e.g., MP3 player) could transmit identifying information for a currently playing selection to a second music player.using a process similar to those processes described in which the second music player could either receive a download or stream from the source based upon the identifying information from a wireless source. By appropriate substitution of the appropriate sources and destinations, any of the processes shown in the flow charts can be suitable modified for audio or pure video content. In the interest of reasonable brevity of the present disclosure, each possible scenario is not depicted via separate flow chart processes. Instead, the table below provides a non-exhaustive outline of many of the possibilities, which can be used to adapt the processes and devices depicted above.

the program on the TV (the mobile device records the audio using its built-in microphone), and GPS or other location information of the mobile handset.

| SOURCE DEVICE | TARGET DEVICE | CONTENT SOURCE FOR SOURCE | CONTENT SOURCE FOR TARGET | HOW CONTENT RECEIVED |
| --- | --- | --- | --- | --- |
| TV receiver device | PWD | Cable, satellite, IPTV (a possible source for TV), or terrestrial broadcast | Wireless phone service provider, or other compatible video service provider e.g. sources for mobile device can include such sources as: regular terrestrial TV broadcasts, or DVB-H terrestrial broadcasts, or DMB-H satellite broadcasts for mobile devices. | Stream or download |
| TV receiver device | PWD | Cable, satellite or terrestrial broadcast | Program routing service | Stream or download |
| TV receiver device | PWD | Stored content (e.g. disk storage) | TV receiver device | Download |
| PWD | PWD | Wireless phone service provider, or other compatible video service provider, program routing service, TV receiver device, PWD | Wireless phone service provider, or other compatible video service provider | Stream or download |
| PWD | PWD | Wireless phone service provider, or other compatible video service provider, program routing service, TV receiver device, PWD | Program routing service | Stream or download |
| PWD | PWD | Wireless phone service provider, or other compatible video service provider, program routing service, TV receiver device, PWD | TV receiver device | Download |
| PWD | PWD | Wireless phone service provider, or other compatible video service provider, program routing service, TV receiver device, PWD | PWD | Stream or download |
| PWD | PWD | Music or Video source or PWD | Music or Video source | Stream or download |
| PWD | PWD | Music or Video source or PWD | PWD | Stream or download |

Other combinations are also possible without departing from embodiments consistent with the present invention.

In certain embodiments consistent with the present invention, the television might be unable to transmit to the PWD for any number of reasons. In this embodiment, the program description information cannot be sent from the TV to the mobile device in the manner described above, either because the television cannot access its own program description information and/or because the television has not implemented wireless communication as used by the previously described embodiments. In this case the program being displayed on the television is identified without assistance from the TV, i.e. by use of the cellular telephone and cellular network.

In this embodiment, the cellular phone (or other mobile device) is used to take a photo or short video or audio sample of the program being displayed by the television. The cellular phone or other PWD then performs image processing on the photo, video or audio sample and extracts attributes of the information such as edges, objects, relative sizes, text, audio and/or similar information. This information is then transmitted via the mobile device to its network service provider where the information is compared with a dynamic database of similar features of video content being contemporaneously broadcast or otherwise provided by various television sources to identify a matching set of programming that the network can begin transmitting to the mobile device. In variations of the present embodiment, raw unprocessed video and/or audio can be sent to the service provider and all processing takes place at the service provider using its processing resources.

In order to faciliate the matching process, the mobile handset may also provide information such as digitized audio of the program on the TV (the mobile device records the audio using its built-in microphone), and GPS or other location information of the mobile handset.

Alternatively, any of the actions as described above may occur at the service node on the cellular network (i.e., at the service provider), which decreases computational requirements on the mobile handset. The matching may be based on matching of only the image, or video, or audio, or any combination of these three.

All embodiments described herein can be carried out not only to synchronization of content from a main TV to a mobile device capable of showing TV content, but also to synchronization from one mobile video device to another mobile video device.

Referring now to FIG. 11, a flow chart 500 depicting an example process embodiment consistent with the present invention is depicted starting at 502. At 504 a video, still image, audio, GPS data and/or other data are captured by video, audio, or GPS data obtained using video, audio or GPS recording circuitry forming 506 or 508 forming a part of the PWD 22 of FIG. 1. The captured data can then be processed at 512 (in this example at the PWD 22) to extract significant attributes (e.g., edges, objects, relative sizes, text, audio and/or similar information). The processed attributes can then be sent to the service provider at 516. The service provider then matches those attributes to a dynamic database of content, such as those transmitted from local sources, or popular films at 520 in an effort to identify the currently displayed program on the television. If a match is not found at 524, a message can be transmitted to the PWD 22 indicating that no match was found at 528 and the process ends at 530. However, if a match is found at 524, a message indicating that a match has been found at 532 from the service provider to the PWD 22. The PWD 22 can then place an order for the content at 536 and the service provider can begin streaming the content (or otherwise sending the content) to the PWD 22 at 540 until terminated at 530. Any suitable payment scheme may be integrated into this process. Additionally, elements 512 and 516 can readily be interchanged so that all processing of the captured information is carried out at the service provider.

In certain embodiments, GPS data identifying the location of the PWD 22 can be used to narrow down the possibilities of programming to that available via broadcast, cable or satellite in a particular geographic area, thus simplifying the search. In addition, the image processing carried out at 512 can include a search of the captured data for identifiable watermarks such as network identifiers and onscreen display (OSD) data as an aid in identification of the program.

Thus, a method consistent with certain embodiments provides portable delivery of television programs to a portable wireless device (PWD) involves using the PWD to capture a sample of a program being played by a television; transmitting attributes of the captured sample to a service provider so that the service provider can identify the program being played by the television; and receiving the television program at the PWD from the service provider via a wireless transmission.

In certain embodiments, the captured sample comprises at least one of an audio, a video and a still image sample of the program. In certain embodiments, the attributes comprise the captured sample In certain embodiments, the attributes comprises at least one of information defining edges of displayed objects, displayed objects, relative sizes of displayed objects, text appearing in the image and an audio sample. In certain embodiments, the service provider comprises one of DVBH, DMB, and cellular infrastructure. In certain embodiments, the service provider comprises a cellular telephone network selected from the group consisting of CDMA 2000 and IEEE 802.16 compatible networks In certain embodiments, an order for the program is transmitted to the portable wireless device. In certain embodiments, the order is transmitted via a cellular telephone network In certain embodiments, receiving the wireless transmission of the television program involves receiving a high speed data transmission via a cellular telephone network. In certain embodiments, the PWD comprises one of a cellular telephone, a wireless telephone, a personal digital assistant (PDA), a palm-top computer, a personal information manager, and a game console. In certain embodiments, the sample is captured via a camera forming a part of the PWD. In certain embodiments, the sample is captured via an audio recorder forming a part of the PWD. A computer readable storage medium can carry instructions that, when executed on a programmed processor carry out any of the processes consistent with embodiments of the present invention.

In certain embodiments, a method for providing portable delivery of television programs to a portable wireless device (PWD) involves using the PWD to capture an audio or video sample of a program being played by a television using an audio or video recorder forming a part of the PWD, wherein the captured sample comprises at least one of an audio, a video and a still image sample of the program; transmitting attributes of the captured sample to a service provider so that the service provider can identify the program being played by the television; transmitting an order for the program to be transmitted to the portable wireless device; and receiving the television program at the PWD from the service provider via a wireless transmission.

In certain embodiments, the attributes comprise the captured sample. In certain embodiments, the attributes comprises at least one of information defining edges of displayed objects, displayed objects, relative sizes of displayed objects, text appearing in the image, GPS data and an audio sample. In certain embodiments, the service provider comprises one of DVBH, DMB, and cellular infrastructure. In certain embodiments, the PWD comprises one of a cellular telephone, a wireless telephone, a personal digital assistant (PDA), a palm-top computer, a personal information manager, and a game console.

In certain embodiments, a portable wireless device (PWD) apparatus that receives delivery of television programs has an audio or video recording device forming a part of the PWD that captures an audio or video sample of a program being played by a television, wherein the captured sample comprises at least one of an audio, a video, GPS data and a still image sample of the program. A transmitter that transmits attributes of the captured sample to a service provider so that the service provider can identify the program being played by the television. A receiver receives the television program at the PWD from a television transmitter via a wireless transmission. The service provider that identifies the program being played can be different from the service provider that provides the television transmitter to the PWD in certain embodiments, while in other embodiments both functions can be carried out by a single service provider.

In certain embodiments, the transmitter further transmits an order for the program to be transmitted to the portable wireless device. In certain embodiments, the attributes comprise the captured sample. In certain embodiments, the attributes comprises at least one of information defining edges of displayed objects, displayed objects, relative sizes of displayed objects, text appearing in the image, GPS data and an audio sample. In certain embodiments, the service provider comprises one of DVBH, DMB, and cellular infrastructure. In certain embodiments, the PWD comprises one of a cellular telephone, a wireless telephone, a personal digital assistant (PDA), a palm-top computer, a personal information manager, and a game console.

Those skilled in the art will recognize, upon consideration of the above teachings, that certain of the above exemplary embodiments are based upon use of a programmed processor such as CPU 30 and CPU 44. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments. Thus, no distinction should be made between hardware, software or firmware implementations of any of the components used in implementing embodiments consistent with the present invention.

Those skilled in the art will appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices are represented generically by memory 32 and 52, and the discussed alternatives should be considered equivalents for purposes of this document.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method for providing portable delivery of television programs to a portable wireless device (PWD), comprising:
   using the PWD to capture a sample of a program being played by a television;
   processing the captured sample to extract attributes of the sample of the program being played by the television;
   transmitting the attributes of the captured sample to a service provider so that the service provider can identify the program being played by the television; and
   receiving the television program at the PWD from the service provider via a wireless transmission.

2. The method according to claim 1, wherein the captured sample comprises at least one of an audio, a video and a still image sample of the program.

3. The method according to claim 1, wherein the attributes comprise the captured sample.

4. The method according to claim 1, wherein the attributes comprises at least one of information defining edges of displayed objects, displayed objects, relative sizes of displayed objects, text appearing in a still image, GPS data and an audio sample.

5. The method according to claim 1, wherein the service provider comprises one of DVBH, DMB, and cellular infrastructure.

6. The method according to claim 1, wherein the service provider comprises a cellular telephone network selected from the group consisting of CDMA 2000 and IEEE 802.16 compatible networks.

7. The method according to claim 1, further comprising transmitting an order for the program to be transmitted to the portable wireless device.

8. The method according to claim 7, further comprises transmitting the order via a cellular telephone network.

9. The method according to claim 1, wherein receiving the wireless transmission of the television program comprises receiving a high speed data transmission via a cellular telephone network.

10. The method according to claim 1, wherein the PWD comprises one of a cellular telephone, a wireless telephone, a personal digital assistant (PDA), a palm-top computer, a personal information manager, and a game console.

11. The method according to claim 1, wherein the sample is captured via a camera forming a part of the PWD.

12. The method according to claim 1, wherein the sample is captured via an audio recorder forming a part of the PWD.

13. A computer readable non-transitory medium carrying instructions that, when executed on a programmed processor carry out the process according to claim 1.

14. A method for providing portable delivery of television programs to a portable wireless device (PWD), comprising:
   using the PWD to capture an audio or video sample of a program being played by a television using an audio or video recorder forming a part of the PWD, wherein the captured sample comprises at least one of an audio, a video and a still image sample of the program;
   processing the captured sample to extract attributes of the sample of the program being played by the television;
   transmitting the attributes of the captured sample to a service provider so that the service provider can identify the program being played by the television;
   transmitting an order for the program to be transmitted to the portable wireless device; and
   receiving the television program at the PWD from the service provider via a wireless transmission.

15. The method according to claim 14, wherein the attributes comprise the captured sample.

16. The method according to claim 14, wherein the attributes comprises at least one of information defining edges of displayed objects, displayed objects, relative sizes of displayed objects, text appearing in a still image, GPS data and an audio sample.

17. The method according to claim 14, wherein the service provider comprises one of DVBH, DMB, and cellular infrastructure.

18. The method according to claim 14, wherein the PWD comprises one of a cellular telephone, a wireless telephone, a personal digital assistant (PDA), a palm-top computer, a personal information manager, and a game console.

19. A portable wireless device (PWD) apparatus that receives delivery of television programs, comprising:
   an audio or video recording device forming a part of the PWD that captures an audio or video sample of a program being played by a television, wherein the captured sample comprises at least one of an audio, a video and a still image sample of the program;
   a processor that processes the captured sample to extract attributes of the sample of the program being played by the television;
   a transmitter that transmits the attributes of the captured sample to a first service provider so that the first service provider can identify the program being played by the television; and
   a receiver that receives the television program at the PWD from a television transmitter via a wireless transmission.

20. The PWD apparatus according to claim 19, wherein the transmitter further transmits an order for the program to be transmitted to the portable wireless device.

21. The PWD apparatus according to claim 19, wherein the attributes comprise the captured sample.

22. The PWD apparatus according to claim 19, wherein the attributes comprises at least one of information defining edges of displayed objects, displayed objects, relative sizes of displayed objects, text appearing in a still image, GPS data and an audio sample.

23. The PWD apparatus according to claim 19, wherein the PWD comprises one of a cellular telephone, a wireless telephone, a personal digital assistant (PDA), a palm-top computer, a personal information manager, and a game console.

24. The PWD apparatus according to claim 19, wherein the television transmitter comprises a part of the first service provider.

25. The PWD apparatus according to claim 19, wherein the television transmitter comprises a part of a second service provider.

26. The PWD apparatus according to claim 19, wherein at least one of the first and second service providers comprises one of DVBH, DMB, and cellular infrastructure.

* * * * *